(12) United States Patent
Tomioka et al.

(10) Patent No.: US 10,185,184 B2
(45) Date of Patent: Jan. 22, 2019

(54) LIQUID CRYSTAL DISPLAY DEVICE

(71) Applicant: Japan Display Inc., Tokyo (JP)

(72) Inventors: Yasushi Tomioka, Hitachinaka (JP); Noboru Kunimatsu, Chiba (JP); Yosuke Hyodo, Chiba (JP); Toshiki Kaneko, Chiba (JP); Yuko Matsumoto, Onjuku-machi (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/660,254

(22) Filed: Jul. 26, 2017

(65) Prior Publication Data

US 2017/0322442 A1 Nov. 9, 2017

Related U.S. Application Data

(63) Continuation of application No. 14/968,042, filed on Dec. 14, 2015, now Pat. No. 9,746,718, which is a
(Continued)

(30) Foreign Application Priority Data

Dec. 19, 2011 (JP) ................................ 2011-277234

(51) Int. Cl.
  *G02F 1/1368* (2006.01)
  *G02F 1/1339* (2006.01)
  *G02F 1/1362* (2006.01)

(52) U.S. Cl.
  CPC ........ *G02F 1/13394* (2013.01); *G02F 1/1339* (2013.01); *G02F 1/1368* (2013.01);
  (Continued)

(58) Field of Classification Search
  CPC .................................................. G02F 1/13394
  (Continued)

(56) References Cited

U.S. PATENT DOCUMENTS 6,184,959 B1   2/2001   Izumi
7,751,019 B2   7/2010   Cho et al.
(Continued)

FOREIGN PATENT DOCUMENTS

CN   1892381 A    1/2007
CN   101071220 A   11/2007
(Continued)

OTHER PUBLICATIONS

Office Action dated Aug. 4, 2015 regarding a corresponding Japanese Patent Application No. 2011-277234.
(Continued)

*Primary Examiner* — Sang V Nguyen
(74) *Attorney, Agent, or Firm* — Typha IP LLC

(57) ABSTRACT

A liquid crystal display device includes: a TFT substrate having gate lines and data lines arranged thereon, the gate lines extending in a first direction and arranged in a second direction, the data lines extending in the second direction and arranged in the first direction; a counter substrate having a black matrix and a color filter; and liquid crystals put between the TFT substrate and the counter substrate. Columnar spacers are fainted on the counter substrate. Pedestals are formed on portions of the TFT substrate, the portions corresponding to the columnar spacers. A convex portion and a concave portion are present at the top end of the columnar spacer. The pedestal is formed corresponding to the concave portion. The concave portion is opened at the ends thereof and connected to the lateral side of the columnar spacer.

20 Claims, 15 Drawing Sheets

Related U.S. Application Data continuation of application No. 13/719,285, filed on Dec. 19, 2012, now Pat. No. 9,250,479.

(52) U.S. Cl.
CPC .............. *G02F 1/136286* (2013.01); *G02F 2001/13396* (2013.01); *G02F 2001/13398* (2013.01)

(58) Field of Classification Search
USPC .......................................................... 349/155
See application file for complete search history.

(56) References Cited

U.S. PATENT DOCUMENTS

| | | | |
|---|---|---|---|
| 8,797,496 B2 | 8/2014 | Tomioka et al. | |
| 2001/0040665 A1* | 11/2001 | Ahn ................. | G02F 1/13394 349/156 |
| 2006/0290857 A1* | 12/2006 | Yang ................. | G02F 1/13394 349/129 |
| 2007/0002264 A1* | 1/2007 | Kim .................. | G02F 1/13394 349/156 |
| 2007/0069204 A1* | 3/2007 | Jang ................. | G02F 1/13394 257/40 |
| 2007/0070286 A1* | 3/2007 | Cho .................. | G02F 1/13394 349/156 |
| 2007/0132936 A1* | 6/2007 | Lee .................. | G02F 1/13394 349/156 |
| 2007/0247584 A1* | 10/2007 | Li ..................... | G02F 1/13394 349/156 |
| 2008/0198317 A1* | 8/2008 | Tseng ............... | G02F 1/13394 349/138 |
| 2009/0147208 A1 | 6/2009 | Tatemori et al. | |
| 2010/0103364 A1* | 4/2010 | Choi ................. | G02F 1/13394 349/157 |
| 2010/0231842 A1* | 9/2010 | Ishitani ............. | G02F 1/13394 349/156 |
| 2011/0228181 A1 | 9/2011 | Jeong et al. | |
| 2012/0081641 A1 | 4/2012 | Noh et al. | |
| 2012/0086901 A1* | 4/2012 | Nakagawa ......... | G02F 1/13394 349/155 |

FOREIGN PATENT DOCUMENTS

| | | | | |
|---|---|---|---|---|
| JP | H10-090708 A | | 4/1998 | |
| JP | H11-125826 A | | 5/1999 | |
| JP | 2000-122071 A | | 4/2000 | |
| JP | 2001-033790 A | | 2/2001 | |
| JP | 2002-229040 A | | 8/2002 | |
| JP | 2006-085123 A | | 3/2006 | |
| JP | 2007-094372 A | | 4/2007 | |
| JP | 2009-002981 A | | 1/2009 | |
| JP | 2009-025529 A | | 2/2009 | |
| JP | 2009-282262 A | | 12/2009 | |
| KR | 10-2005-0092258 | * | 9/2005 | .......... G02F 1/1339 |
| KR | 10-2007-0037052 A | | 4/2007 | |
| KR | 10-2008-0048333 A | | 6/2008 | |
| KR | 10-2008-048333 A | | 6/2008 | |
| WO | 2010146729 A | | 12/2010 | |

OTHER PUBLICATIONS

Office Action dated Mar. 31, 2015 regarding a corresponding Taiwanese Patent Application No. 101147982.
Office Action dated Dec. 23, 2014 regarding a corresponding Chinese Patent Application No. 201210188612.9.

\* cited by examiner

FIG. 9A
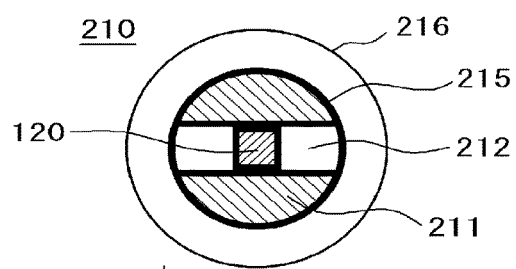
FIG. 9C    FIG. 9B
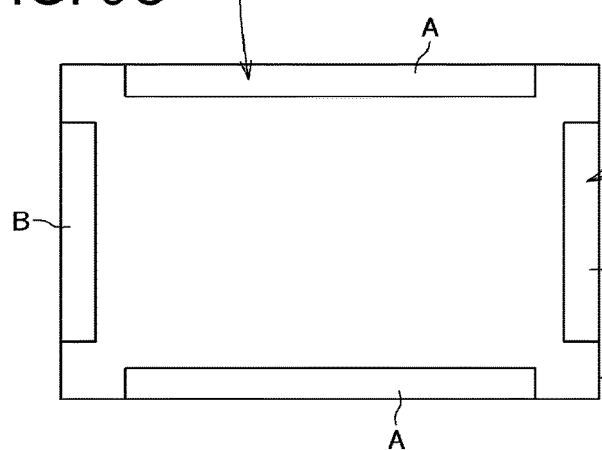
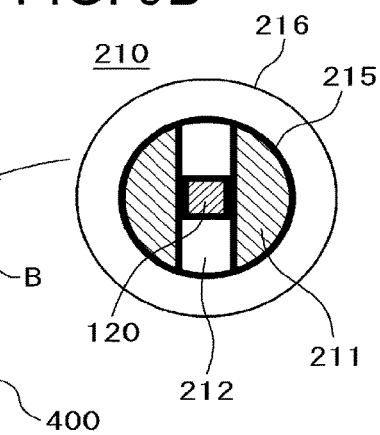

LIQUID CRYSTAL DISPLAY DEVICE

CROSS-REFERENCE TO RELATED APPLICATIONS

This application is a continuation of U.S. patent application Ser. No. 14/968,042, filed on Dec. 14, 2015, which, in turn, is a continuation of U.S. patent application Ser. No. 13/719,285, (now U.S. Pat. No. 9,250,479) filed on Dec. 19, 2012. Further, this application claims priority from Japanese Patent Application No. 2011-277234 filed on Dec. 19, 2011 the contents of which are hereby incorporated by reference into this application.

BACKGROUND OF THE INVENTION

1. Field of the Invention

The present invention relates to a liquid crystal display device. The invention particularly relates to a liquid crystal display device taking measures to prevent bright spots caused by scraped dusts of an alignment film.

2. Description of the Related Art

Liquid crystal display devices include: a TFT substrate having pixel electrodes, thin film transistors (TFT), etc. formed in a matrix; a counter substrate disposed in facing relation to the TFT substrate and having color filters, etc. formed at positions corresponding to the pixel electrodes of the TFT substrate; and liquid crystals put between the TFT substrate and the counter substrate. Images are formed by controlling the light transmittance of liquid crystal molecules for each pixel.

In the liquid crystal display device, an alignment film is formed at the boundary between the counter substrate and the liquid crystal layer in the TFT substrate, and the alignment film is subject to rubbing process or optical alignment process to put the liquid crystal molecules to initial alignment. Then, the amount of light transmitted through the liquid crystal layer is controlled by twisting or rotating the liquid crystal molecules by electric fields from the state of initial alignment.

Meanwhile, to control the thickness of the liquid crystal layer, it is necessary to form spacers between the counter substrate and the TFT substrate. Conventionally, beads, etc. were dispersed as the spacers in the liquid crystal layer. In recent years, however, to control the gap between the TFT substrate and the counter substrate more accurately, columnar spacers are formed on the counter substrate and the gap is controlled by the columnar spacers.

However, use of the columnar spacer additionally raises a new problem. JP-2000-122071-A, JP-2001-33790-A, and JP-2002-229040-A describe the following. When the columnar spacer is formed on the TFT substrate, a reservoir of the alignment film is formed at the periphery of the columnar spacer and the thickness of the alignment film is increased therein. To prevent such increase in the thickness, a concave portion is formed at the top end of the columnar spacer to retain the alignment film in the concave portion thereby preventing increase in the thickness of the alignment film at the periphery of the columnar spacer.

JP-2009-255529-A describes the configuration in which grooves are formed, for example, of a concentric shape at the top end of the columnar spacer and the liquid alignment film is accumulated in the grooves to prevent scraping of the alignment film after drying. Further, the configuration is adapted to ensure the degree of freedom of the size of a pedestal disposed in facing relation to the columnar spacer.

JP-2007-94372-A describes the configuration in which grooves are formed at the surface of a pedestal disposed in facing relation to a columnar spacer and the area of contact between the columnar spacer and the pedestal is adjusted to shorten the recovery time after the substrate has been pressed from the outside.

SUMMARY OF THE INVENTION

For example, when a columnar spacer is disposed to a counter substrate, a pedestal is disposed to a TFT substrate at a portion facing the columnar spacer. The pedestal disposed to the TFT substrate serves to prevent scraping of the alignment film at a portion in contact with the columnar spacer, prevent displacement of the columnar spacer or adjust the stress caused by an urging pressure, when the counter substrate is pressed, etc.

However, such effects were not obtained sufficiently in the related art. For example, in the techniques described in JP-2000-122071-A, JP-2001-33790-A, and JP-2002-229040-A, a concave portion is formed at the top of the columnar spacer provided to the TFT substrate to prevent formation of a liquid reservoir of the alignment film at the periphery of the columnar spacer. However, this configuration results in a problem that the alignment film formed thick in the concave portion at the top of the columnar spacer is scraped off from a portion where the columnar spacer is in contact with the counter substrate, and the scraped dusts cause bright spots.

The technique described in JP-2009-25529-A results in a problem that the alignment film is formed thick in the concentric grooves formed at the top of the columnar spacer, and the thick alignment film is peeled by the contact with the pedestal. Further, in the configuration of JP-2009-25529-A, no sufficient effect can be obtained for the positional displacement of the columnar spacer.

In the technique described in JP-2007-94372-A, grooves are formed to a pedestal. However, this involves a problem that an alignment film is formed thick in the portion of the grooves and the alignment film is peeled off from the portion. Further, it is difficult by the configuration to suppress the positional displacement of the columnar spacer.

The present invention intends to prevent scraping of an alignment film between a columnar spacer and a pedestal, prevent positional displacement of the columnar spacer, prevent the columnar spacer from fracture when the counter substrate is pressed, and rapidly recover the initial state when the pressure is removed.

The present invention intends to overcome the problems described above and typically include the following means. That is, there is provided a liquid crystal display device including: a TFT substrate having gate lines and data lines arranged thereon, the gate lines extending in a first direction and arranged in a second direction, the data lines extending in the second direction and arranged in the first direction; a counter substrate having a black matrix and a color filter; and liquid crystals put between the TFT substrate and the counter substrate. Columnar spacers are formed on the counter substrate. Pedestals are formed on portions of the TFT substrate, the portions corresponding to the columnar spacers. A convex portion and a concave portion are present at the top end of the columnar spacer. The pedestal is formed corresponding to the concave portion. The concave portion is opened at the ends thereof and connected to the lateral side of the columnar spacer.

In this case, a usual state, that is, a state where pressure is not exerted on the counter substrate includes a case where the pedestal and the concave portion of the columnar spacer are in contact with each other and the convex portion of the columnar spacer is not in contact with the TFT substrate, and a case where the convex portion of the columnar spacer is in contact with the TFT substrate and the pedestal portion and the concave portion of the columnar spacer are not in contact with each other.

Further, the convex portion and the concave portion formed to the top end of the columnar spacer can be in various shapes. Further, two or more kinds of columnar spacers may be combined to provide a predetermined effect as a whole.

According to the invention, since the convex portion and the concave portion are disposed to the top end of the columnar spacer, and the concave portion is opened at the ends thereof and connected to the lateral side of the columnar spacer, the alignment film is not formed thick in the concave portion and, accordingly, scraping of the alignment film caused by the contact between the columnar spacer and the pedestal can be prevented.

Further, according to the invention, since the convex portion formed at the top end of the columnar spacer serves as a stopper to the pedestal, positional displacement of the columnar spacer can be prevented.

Further, according to the invention, since one columnar spacer has a portion always in contact with the pedestal and a portion in contact with the pedestal when the counter substrate is pressed, pressure can be dispersed and the counter substrate can be rapidly returned to an initial state when the pressure is released. Further, the columnar spacer can be free from fracture when the counter substrate is pressed.

BRIEF DESCRIPTION OF THE DRAWINGS

FIGS. 9A to 9C are other example showing an arrangement using first columnar spacers and second columnar spacers in the second embodiment;

DESCRIPTION OF THE PREFERRED EMBODIMENTS

The present invention will be described specifically by way of preferred embodiments.

First Embodiment

Figure 1:
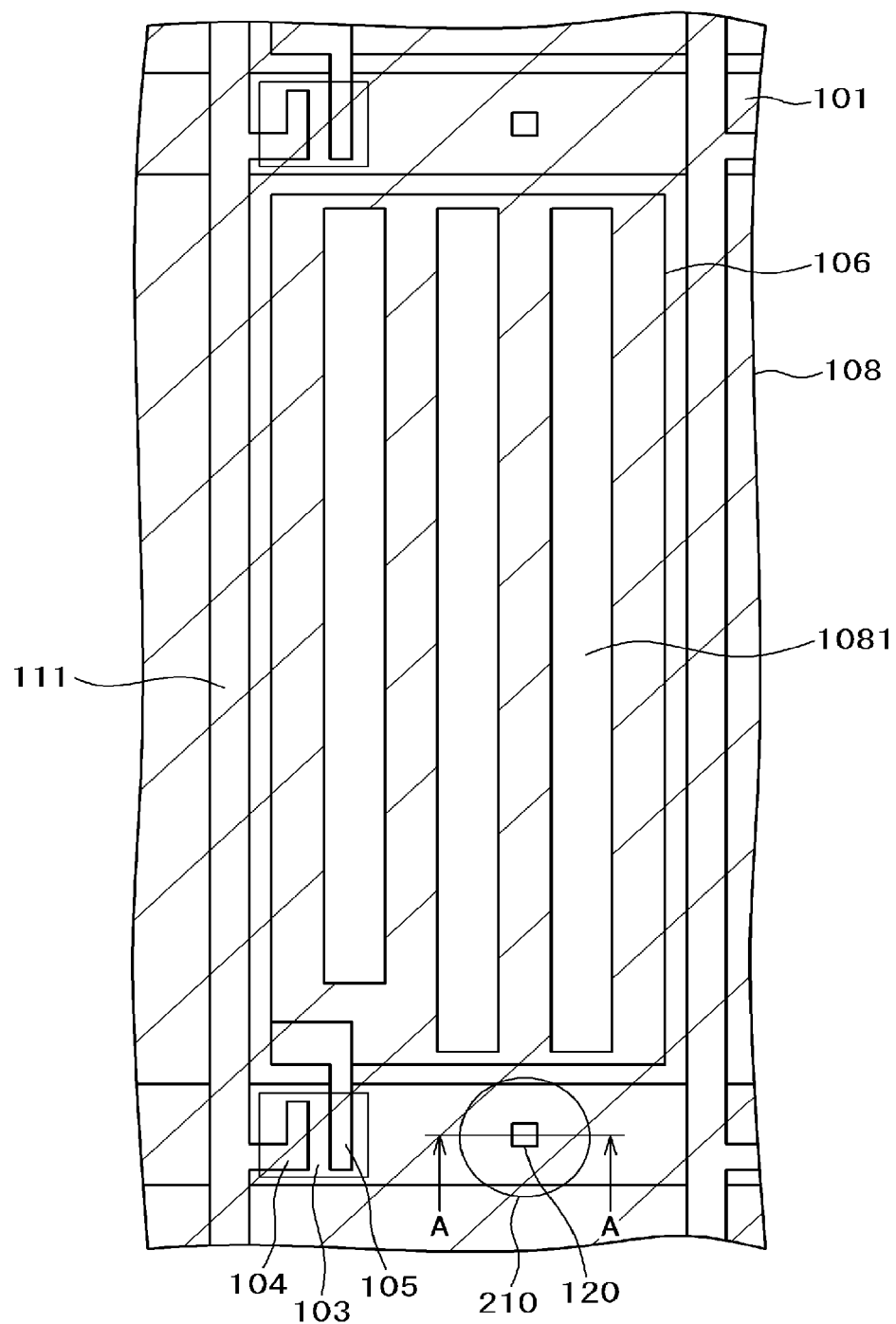
FIG. 1 is a plan view of a liquid crystal display device according to the present invention.

FIG. 1 is a plan view of a pixel portion of a liquid crystal display device to which the invention is applied. In FIG. 1, gate lines 101 are extended in a lateral direction and arranged in a longitudinal direction. Further, data lines 111 are extended in the longitudinal direction and arranged in the lateral direction. A pixel electrode 106 is formed in a region surrounded by the gate lines 101 and the data lines 111. The pixel electrode 106 is formed as a solid plane on which a not illustrated inorganic passivation film is stacked and a counter electrode 108 having slits 1081 is formed thereover. The counter electrode 108 is formed in common with each of pixels.

A semiconductor layer 103 is formed over the gate line 101, and a drain electrode 104 and a source electrode 105 are stacked over the semiconductor layer 103. The drain electrode 104 is branched from the data line 111, and the source electrode 105 is connected to the pixel electrode 106. When a voltage is supplied to the pixel electrode 106 by way of the source electrode 105, electric fields are exerted on a liquid crystal layer 300 through the slit 1081 of the counter electrode 108 to rotate liquid crystal molecules and control the amount of light transmitted through the liquid crystal layer 300. In FIG. 1, a pedestal 120 is formed over the gate line 101. A columnar spacer 210 formed on the counter substrate 200 is in contact with the pedestal 120.

Figure 2:
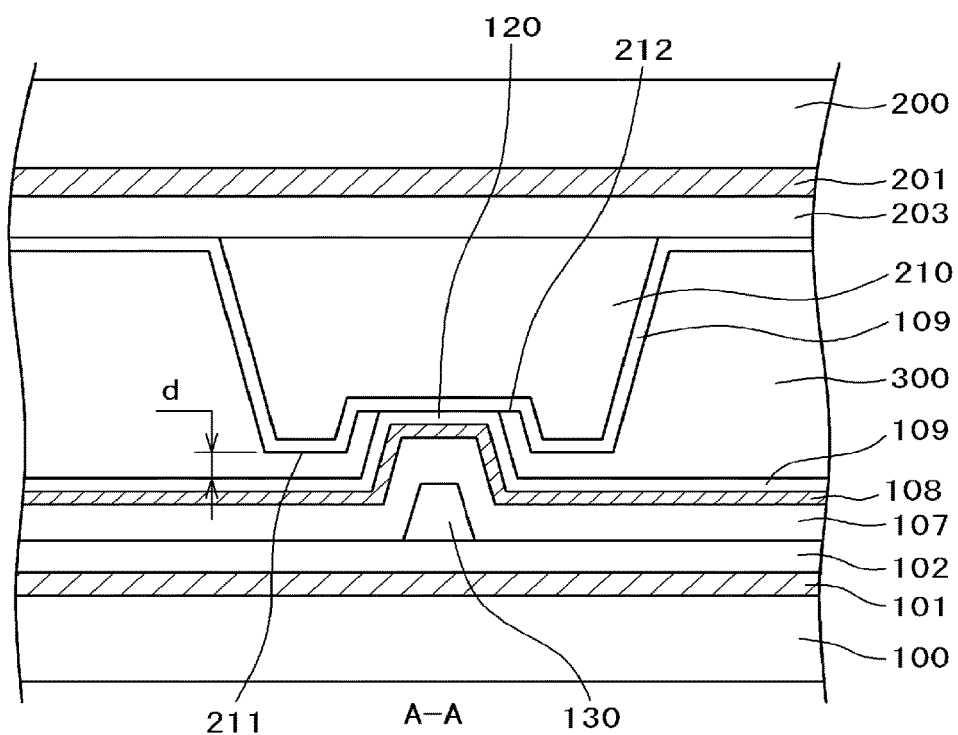
FIG. 2 is a cross sectional view of a first embodiment.

FIG. 2 is a cross sectional view along line A-A in FIG. 1. In FIG. 2, the pedestal 120 formed on a TFT substrate 100 is in contact with a concave portion 212 at the top end of the columnar spacer 210 formed on an overcoat film 203 of a counter substrate 200. In the drawing, the gate line 101 is formed on the TFT substrate 100, and a gate insulating film 102 is formed on the gate line 101. A pedestal base 130 is formed on the gate insulating film 102. The pedestal 120 is formed corresponding to the pedestal base 130.

The semiconductor layer 103 or a metal layer is stacked in accordance with a necessary height to the pedestal base 130. Layers that can be stacked include 150 nm of the semiconductor layer 103, 200 nm of the source-drain electrodes 105, 104, and 70 nm of the pixel electrode 106 formed with ITO (indium tin oxide), etc. Accordingly, when all of the films are stacked, the thickness can be about 420 nm.

An inorganic passivation film 107 comprising SiN is formed so as to cover the gate insulating film 101 and the pedestal base 130, and the counter electrode 108 is formed on the inorganic passivation film 107. The counter electrode 108 over the gate line 101 is formed as a solid film. That is, the counter electrode 108 has the slits 1081 only in the pixel portion. An alignment film 109 is formed so as to cover the counter electrode 108. The thickness of the alignment film 109 is about 70 nm. In FIG. 2, a pedestal 120 in contact with the columnar spacer 210 is formed corresponding to the pedestal base 130.

In FIG. 2, a black matrix 201 is formed on the counter substrate 200, and an overcoat film 203 is formed on the black matrix. The columnar spacer 210 is formed on the overcoat film 203. The columnar spacer 210 is formed, for example, of an acryl resin by photolithography. A convex portion 211 and a concave portion 212 are formed at the top end of the columnar spacer 210. In FIG. 2, a pedestal 120 is in contact with the concave portion 212 of the columnar spacer 210 to keep the TFT substrate 100 and the counter substrate 200 at a predetermined gap. The concave portion 212 and the convex portion 211 at the top end of the columnar spacer 210 can be formed, for example, by half-tone exposure. An alignment film 109 is formed so as to cover the overcoat film 203 and the columnar spacer 210. Liquid crystals 300 are filled between the TFT substrate 100 and the counter substrate 200.

Figure 3:
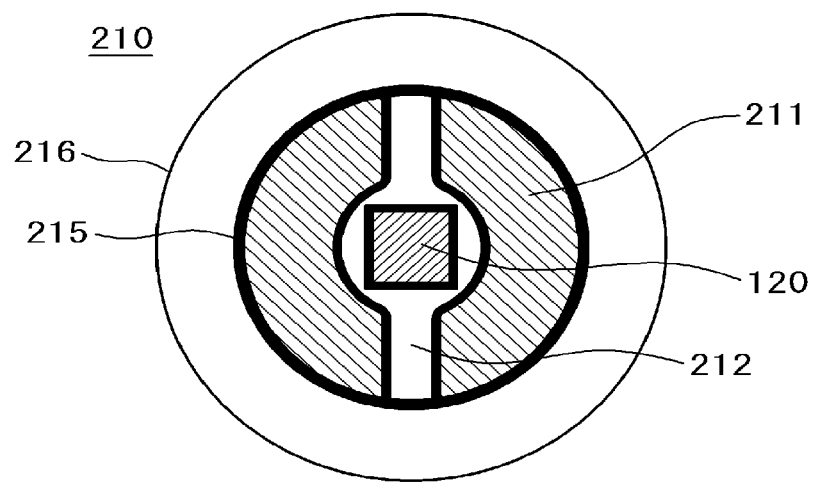
FIG. 3 is a plan view showing a relation between a columnar spacer and a pedestal of the first embodiment.

FIG. 3 is a plan view showing a relation between a columnar spacer 210 and a pedestal 120 in the pedestal portion. As shown in FIG. 2, since the cross section of the columnar spacer 210 is trapezoidal, the base portion of the columnar spacer 210 of a large width is referred to as a lower bottom 216 and the top of the columnar spacer 210 of a small width is referred to as an upper bottom 215. The top end of the columnar spacer 210 is not flat but the convex portion 211 and the concave portion 212 are formed. In FIG. 3, a hatched portion is the convex portion 211 and other portion is a concave portion 212.

In FIG. 3, a concave portion 212 has a grooved shape and a groove thereof is opened at both ends. That is, the groove is connected to the lateral side of the columnar spacer 210 not by way of the convex portion. That is, the concave portion 212 is not surrounded at the entire circumference by the concave portion 211. This is greatly different from the known columnar space. Accordingly, after the alignment film 109 is coated in a liquid state, the alignment film 109 does not accumulate in the concave portion 212, that is, in the groove at the top end of the spacer 210 but flows downwardly on the lateral side of the alignment film 109. Accordingly, the alignment film 109 is not formed thick in the concave portion 212.

The width of the concave portion at the top end of the columnar spacer 210 is increased in the central portion, and the pedestal 120 on the TFT substrate 100 intrudes to this portion. Although the pedestal 120 is square in a plan view, the planar shape is not restricted only thereto but may be circular, rectangular, or elliptic. The planar shape is determined depending on the shape of the pedestal base 130.

Since the alignment film 109 is not formed thick in the concave portion 212 of the columnar spacer 210, scraping of the alignment film does not result in a serious problem. In addition, as shown in FIG. 2 and FIG. 3, since the pedestal 120 is surrounded by the convex portion 211 of the columnar spacer 210, even when the counter substrate 200 is pressed from the outside, the columnar spacer 210 does not move easily to the pedestal. Also in this regard, scraping of the alignment film can be prevented. Further, no positional displacement is caused between the TFT substrate 100 and the counter substrate 200.

In FIG. 2, when the counter substrate 200 is pressed, the pedestal 120 or the columnar spacer 210 is compressed. In this case, when the convex portion 211 of the columnar spacer 210 is in contact with the facing surface of the TFT substrate 100, reaction is generated therein to disperse the force. Accordingly, the pedestal 120, etc. are not fractured. Further, since the reaction increases gradually, the counter substrate 200 can recover the initial state in a short time after removal of the pressure exerted on the counter substrate 200. Such an effect can be obtained effectively by defining the distance between the convex portion 211 of the columnar spacer 210 and the facing surface of the TFT substrate 100 to 0.2 μm or more.

Figure 4:
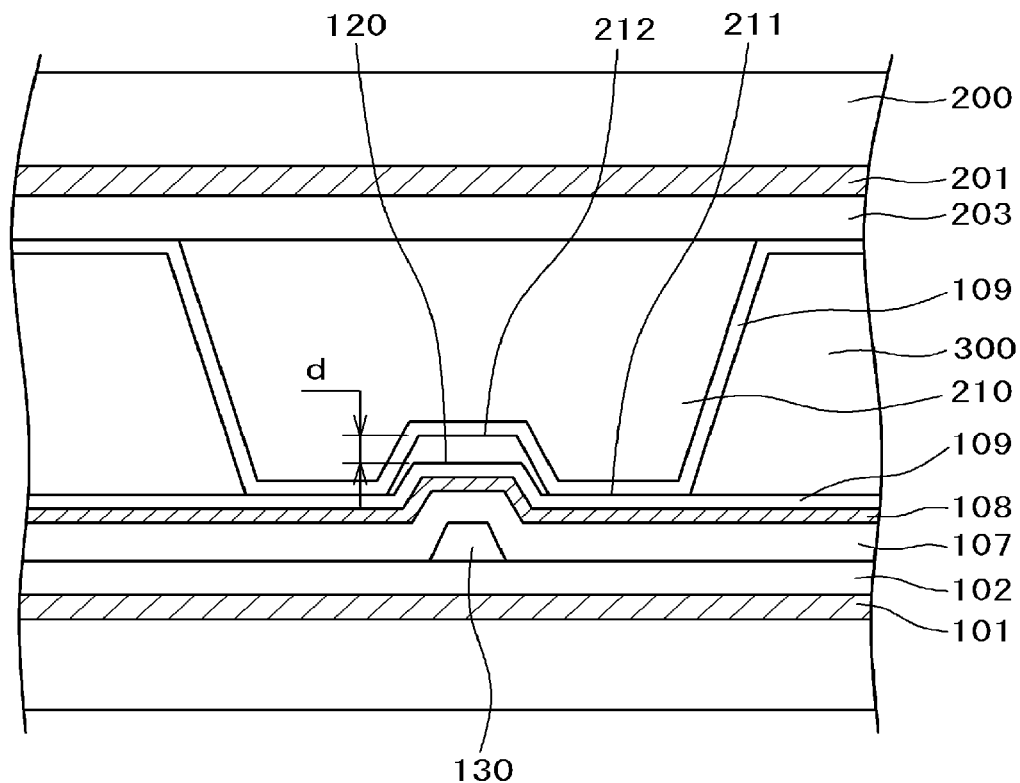
FIG. 4 is a cross sectional view showing an other example of the first embodiment.

FIG. 4 shows another example of this embodiment. The embodiments in FIG. 4 and FIG. 2 are different in that the depth of the concave portion 212 at the top end of the columnar spacer 210 in FIG. 4 is larger than that in FIG. 2 and the convex portion 211 of the columnar spacer 210 is in contact with the facing surface of the TFT substrate 100 in a usual state and the pedestal 120 is not in contact with the concave portion 212 of the columnar spacer 210 in the usual state. The plan view showing a relation between the columnar spacer 210 and the pedestal 120 in the pedestal portion is identical with FIG. 3.

The configuration can be obtained by increasing the depth of the concave portion 212 of the columnar spacer 210, and, in addition, by lowering the height of the pedestal 120. The height of the pedestal 120 can be adjusted depending on the height of the pedestal base 130 formed below. The height can be adjusted by removing the semiconductor layer 103, the drain electrode layer 104, or the pixel electrode 106 from the pedestal base 130.

In the embodiment in FIG. 4, when a force is exerted on the counter substrate 200, the convex portion 211 of the columnar spacer 210 is compressed at first. When the force on the counter substrate 200 further increases, the pedestal 120 is in contact with the concave portion 212 of the columnar spacer 210. This increases the reaction. By the effect as described above, the columnar spacer 210 or the pedestal 120 can be free from fracture and the counter substrate 200 can recover the initial state in a short time after removal of the pressing force therefrom in the same manner as the configuration of FIG. 2. In FIG. 4, the distance between the top end of the pedestal 120 and the concave portion 212 of the columnar spacer 210 is preferably 0.2 μm or more.

Figure 5:
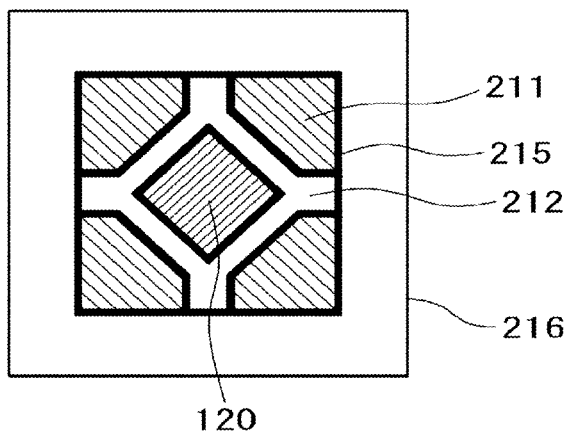
FIG. 5 is a plan view showing a further example of the first embodiment.

FIG. 5 is a plan view showing a further example of this embodiment. While the columnar spacer 210 in FIG. 2 and FIG. 4 is a truncated cone having a circular shape in a plan view as shown in FIG. 3, the spacer in FIG. 5 is a truncated pyramidal cone having a square shape in a plan view. The top end of the columnar spacer 210 in FIG. 5 is square, and convex portions 211 are formed each at the corners of the square shape. The concave portion 212 is formed in a grooved shape from the central portion where the pedestal 120 intrudes to each of the sides and the groove is opened to the lateral side of the columnar spacer 210.

Since the liquid material of the light alignment film flows from the grooved portion formed at the top end of the columnar spacer 210 to the lateral side of the columnar spacer 210, the alignment film 109 is not formed thick in the concave portion 212. Accordingly, scraping of the alignment film caused by contact between the pedestal 120 and the columnar spacer 210 can be prevented. Further, since the pedestal 120 is surrounded by the convex portion 211 of the columnar spacer 210, the problem of positional displacement between the counter substrate 200 and the TFT substrate 100 does not occur.

Also in the case where the columnar spacer 210 and the pedestal 120 have a planar shape as shown in FIG. 5, the cross sectional shape of the columnar spacer 210 and the pedestal 120 can be in the same configuration as in FIG. 2 or FIG. 4. Accordingly, when the counter substrate 200 is pressed from the outer side, the columnar spacer 210 or the pedestal 120 can be free from fracture and the recovery time to the initial state upon removal of pressure on the counter substrate 200 can also be shortened.

Second Embodiment

Figure 6:
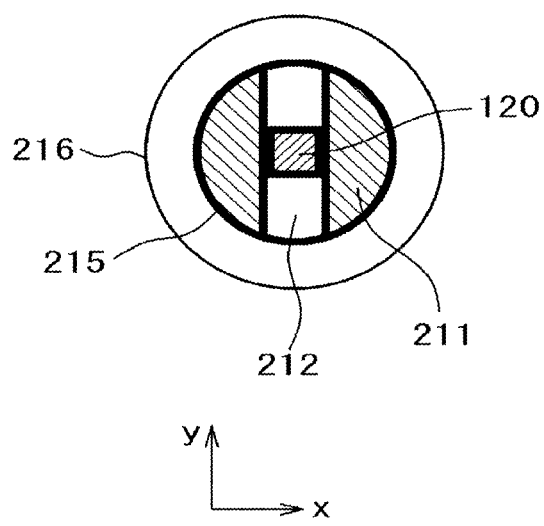
FIG. 6 is a plan view showing a relation between a first columnar spacer and a pedestal of a second embodiment.
Figure 7:
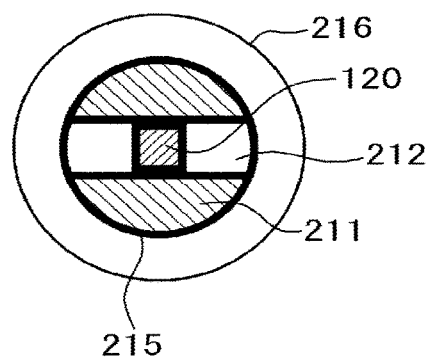
FIG. 7 is a plan view showing a relation between a second columnar spacer and a pedestal of the second embodiment.
Figure 7:
Figure 8:
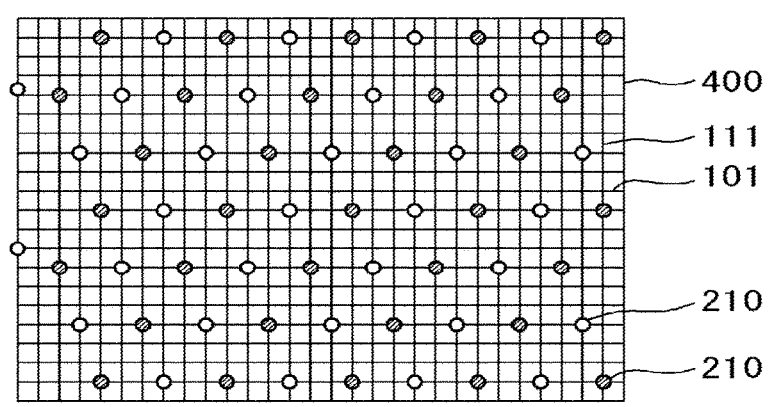
FIG. 8 is an example showing an arrangement of first and second columnar spacers in the second embodiment.
Figure 8:
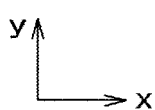

FIGS. 6 to 8 are views showing the shape and the arrangement of the columnar spacers 210 according to a second embodiment of the invention. FIG. 6 and FIG. 7 are plan views showing the state where the pedestal 120 intrudes to the concave portion 212 of the columnar spacer 210.

FIG. 6 shows a state in which a groove-shaped concave portion 212 opened at the ends thereof in the longitudinal direction, that is, in a y direction is formed on the top end of the columnar spacer 210. FIG. 7 shows a state in which a groove-shaped concave portion 212 opened at the ends thereof in the lateral direction, that is, in an x direction is formed on the top end of the columnar spacer 210.

In both of the columnar spacer 210 in FIG. 6 and the columnar spacer 210 in FIG. 7, since the concave portion 212 is opened at the ends and the liquid alignment film flows to the outside, the alignment film 190 is not formed thick in the concave portion 212. Accordingly, scraping of the alignment film can be prevented.

In FIG. 6, the pedestal 120 cannot move in the lateral direction, that is, in the x direction due to the presence of the convex portion 211 of the columnar spacer 210. That is, lateral displacement between the counter substrate 200 and the TFT substrate 100 can be prevented. In FIG. 7, the pedestal 120 cannot move in the longitudinal direction, that is, in the y direction due to the presence of the convex portion 211 of the columnar spacer 210. That is, longitudinal displacement between the counter substrate 200 and the TFT substrate 100 can be prevented.

Accordingly, displacement between the TFT substrate 100 and the counter substrate 200 can be suppressed in both of the x direction and the y direction by the combination of the columnar spacer 210 in FIG. 6 and the columnar spacer 210 in FIG. 7. FIG. 8 is an example in which such effects can be obtained by the combination of the columnar spacer 210 shown in FIG. 6 and the columnar spacer 210 shown in FIG. 7.

In FIG. 8, each of blank circles represents the columnar spacer 210 as shown in FIG. 6 and each of hatched circles represents the columnar spacer 210 as shown in FIG. 7. In FIG. 8, positional displacement between the TFT substrate 100 and the counter substrate 200 in both of the x direction and the y direction is prevented by alternately arranging the columnar spacers 210 shown in FIG. 6 and the columnar spacers 210 shown in FIG. 7.

Incidentally, when the counter substrate 200 of the liquid crystal display panel is pressed by a finger, an identical stress is not applied to all of the regions in a display region 400. For example, when a central portion of the display region 400 is pressed shown in FIG. 9C, a stress in the y direction is applied in a region A near the longer side of the display region 400, and a stress in the x direction is applied in the region B near the shorter side. For preventing the positional displacement by the stresses, in the region A of FIG. 9C, displacement in the y direction can be prevented by using more number of the columnar spacers 210 shown in FIG. 9A where the groove at the top end of the columnar spacer 210 is formed in the x direction. Displacement in the x direction can be prevented by using more number of columnar spacers 210 in the region B of FIG. 9C where the groove at the top end of the columnar spacer 210 is formed in the y direction.

Figure 10:
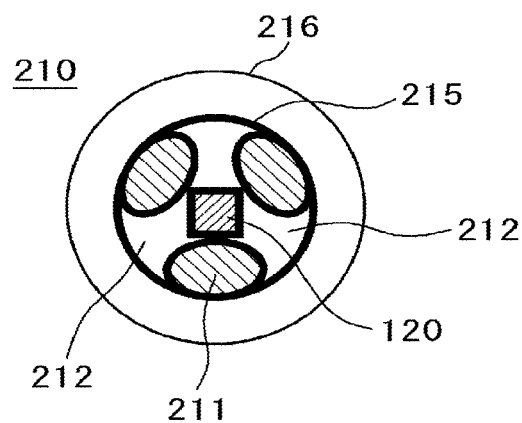
FIG. 10 is a modified example showing a relation between the shape of a columnar spacer and a pedestal in the second embodiment.
Figure 11:
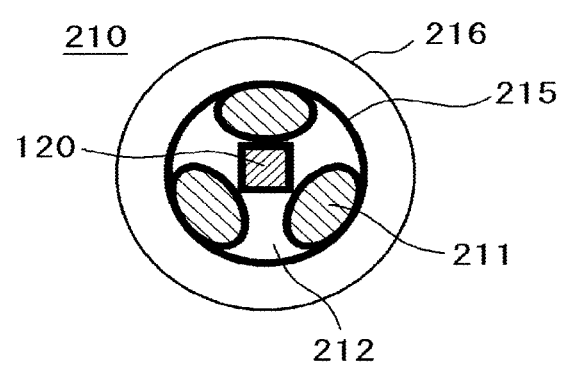
FIG. 11 is other modified example showing a relation between the shape of a columnar spacer and a pedestal in the second embodiment.

FIG. 10 and FIG. 11 are plan views for the combination of the columnar spacer 210 and the pedestal 120 showing other examples of this embodiment. FIG. 10 shows an example where convex portions 211 are formed by the number of three each at 120° interval in view of polar coordination at the top end of the columnar spacer 210. Then, concave portions 212 each opened at the end are formed by the number of three. A pedestal 120 intrudes to the concave portion 212 of each of the regions partitioned by the three convex portions 211.

In FIG. 11, three convex portions 211 formed at the top end of the columnar spacer 210 are disposed each to a position rotated by 60 degree when compared with FIG. 10. Other shapes are identical with those in FIG. 10. By the combined use of the columnar spacer 210 shown in FIG. 10 and the columnar spacer 210 shown in FIG. 11, the configuration can be attained in which the displacement is suppressed in any of the x direction and the y direction of a display region 400 shown at FIG. 9C.

FIG. 10 and FIG. 11 are in such a relation that the convex portions 211 at the top end of the columnar spacer 210 are rotated each by 60 degree. In this case, when the number of the convex portions 211 formed at the top end of the columnar spacer 210 is defined as 3, the rotational angle of the convex portions 211 can be calculated as 360/(3×2). The number of the convex portions 211 at the top end of the columnar spacer 210 can also be the number of n which is 4 or greater. In this case, a liquid crystal display panel with less displacement between the counter substrate 200 and the TFT substrate 100 can be attained by defining the positions of the convex portions 211 in the two types of the columnar spacers 210 in such a relation that they are rotated by 360/(n×2) and arranging the two kinds of the columnar spacers 210 in combination.

Third Embodiment

Figure 12:
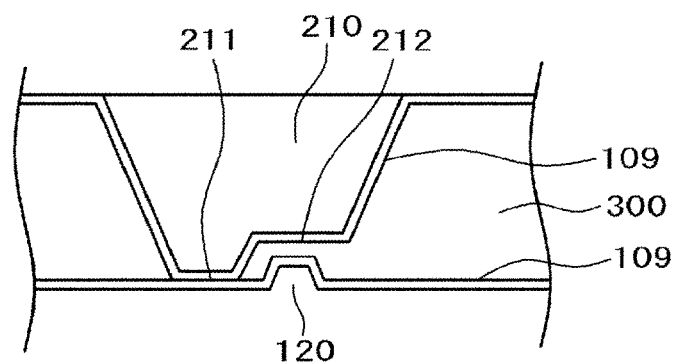
FIG. 12 is a cross sectional view showing a relation between a columnar spacer and a pedestal in the third embodiment.
Figure 13:
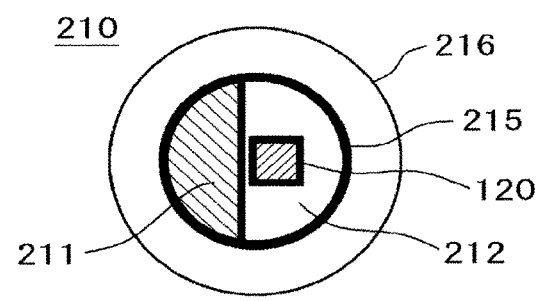
FIG. 13 is a plan view showing a relation between a columnar spacer and a pedestal in the third embodiment.

FIG. 12 is a cross sectional view showing a relation between a columnar spacer 210 and a pedestal 120. FIG. 13 is a plan view of a combination of the columnar spacer 210 and the pedestal 120 as viewed on the side of the TFT substrate 100. As shown in FIG. 12 and FIG. 13, a convex portion 211 and a concave portion 212 are formed each by one on the top end of the columnar spacer 210. The concave portion 212 is opened to the outside except for the side of the convex portion 211 and, accordingly, the material of the alignment film does not form a liquid reservoir. That is, the alignment film 109 is not formed thick in the concave portion 212.

In FIG. 12, a convex portion 211 and a concave portion 212 are formed at the top end of a columnar spacer 210. While the convex portion 211 is in contact with the TFT substrate 100, the pedestal 120 formed on the TFT substrate 100 is not in contact with the concave portion 212 at the top end of the columnar spacer 210. When an external force is exerted on the counter substrate 200 of the liquid crystal display panel, the pedestal 120 of the TFT substrate 100 and the concave portion 212 of the columnar spacer 210 are in contact with each other to generate larger reaction. Accordingly, the stress to the pressure can be increased gradually, and the recovery time to the initial state when pressure is removed can be shortened.

Figure 14:
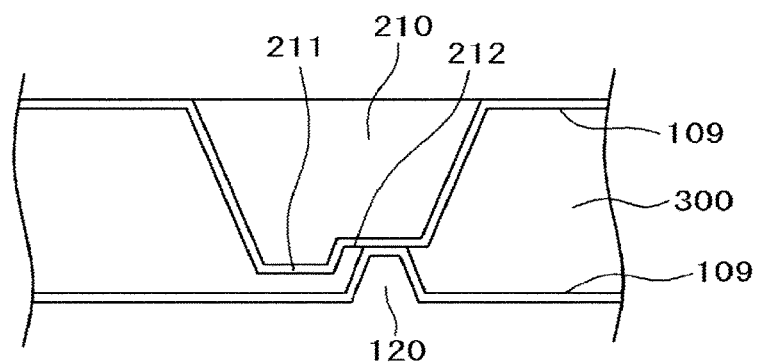
FIG. 14 is a cross sectional view showing other example of the relation between a columnar spacer and a pedestal in the third embodiment.

In FIG. 14, contrary to FIG. 12, a pedestal 120 formed on the TFT substrate 100 is in contact with a concave portion 212 of a columnar spacer 210, but the convex portion 211 of the columnar spacer 210 is not in contact with the TFT substrate 100. When an external force is exerted on the counter substrate 200 of the liquid crystal display panel, the concave portion 211 of the columnar spacer 210 and the TFT substrate 100 are in contact with each other to cause greater reaction. The effect is identical with that in FIG. 12. The plan view on the side of the TFT substrate 100 in FIG. 14 is identical with that of FIG. 13.

In FIG. 12 or FIG. 14, the pedestal 120 constrains the movement of the columnar spacer 210 only in one direction. That is, the movement cannot be restricted in the direction other than the direction where the convex portion 211 is formed at the top end of the columnar spacer 210. In this embodiment, positional displacement between the TFT substrate 100 and the counter substrate 200 is prevented as the entire liquid crystal display panel by arranging the columnar spacers 210 in FIG. 12 or FIG. 14 while changing the direction thereof.

Figure 15:
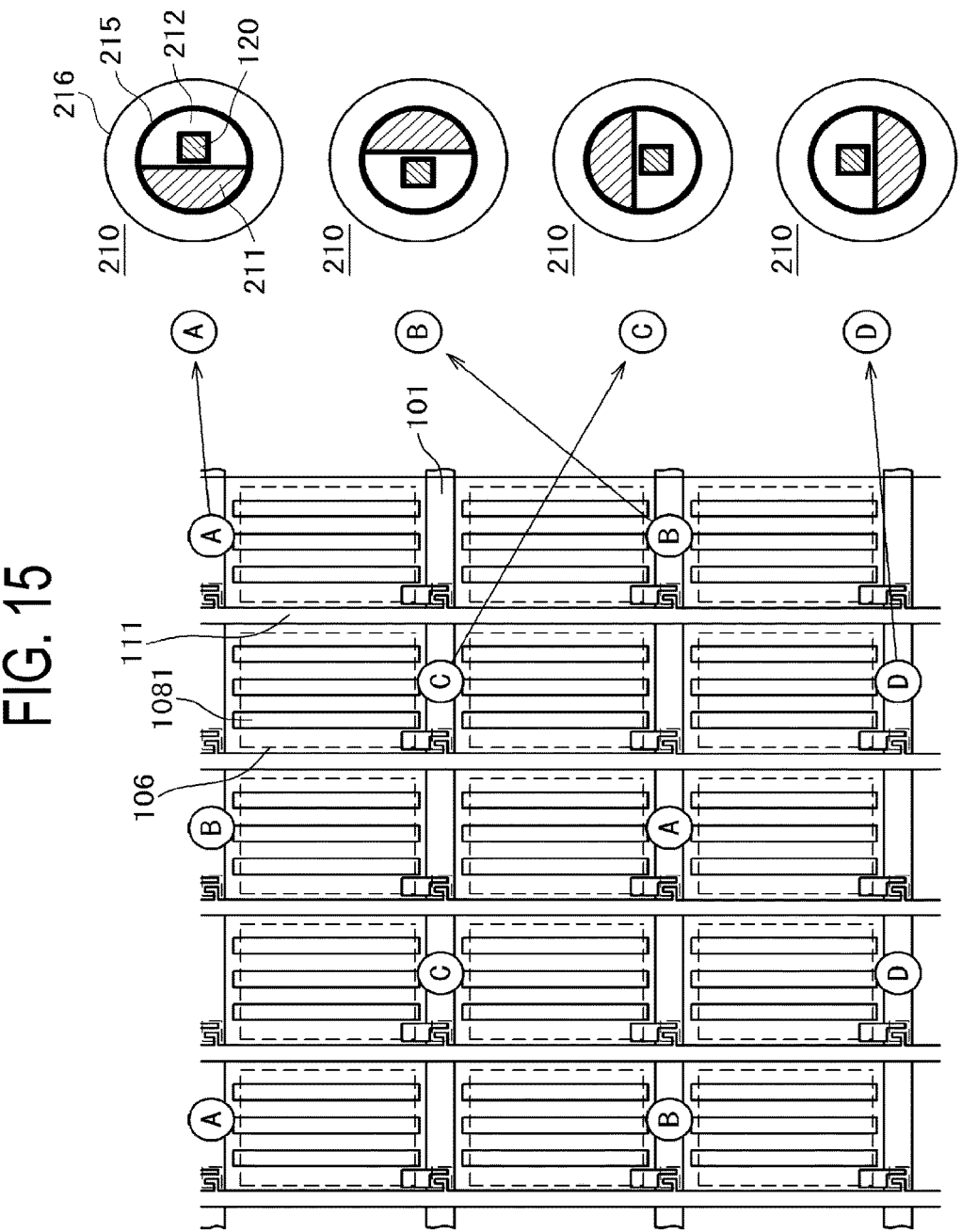
FIG. 15 shows an example of an arrangement of columnar spacers in the third embodiment.

FIG. 15 is an example of arranging the columnar spacers 210 in this embodiment. In a plan view for the columnar spacers 210 in FIG. 15, the protrusion 211 is formed on the left in the spacer A, the protrusion 211 is formed on the right in the spacer B, the protrusion 211 is formed above in the spacer C and the convex portion 211 is formed below in the spacer D. In FIG. 15, pixels partitioned by the gate lines 101 and the data lines 111 are arranged by the number of 15. The pedestal 120 is formed over the gate line 101 and the columnar spacer 210 is also arranged over the gate line 101.

As shown in FIG. 15, spacers A in which the convex portion 211 is formed on the left at the top end of the columnar spacer 210 and spacers B in which the convex portion 211 is formed on the right at the top end of the columnar spacer 210 are arranged alternately over the uppermost gate line 101. Further, spacers C in which the convex portion 211 is formed above at the top end of the columnar spacer 210 are arranged over the second gate line 101 from above. Spacers A in which the convex portion 211 is formed on the left and spacer B in which the convex portion 211 is formed on the right are alternately arranged over the third gate line 101 from above. In this case, they are arranged while displacing the relation between the spacers A and B each by one row relative to the row of the pixels from the arrangement over the uppermost gate line 101. Spacers D in which the convex portion 211 is formed below at the top end of the columnar spacer 210 are arranged over the lowermost gate line 101.

As described above, in this embodiment, displacement between the TFT substrate 100 and the counter substrate 200 is restricted over the entire display region 400. Arrangement for the columnar spacers A, B, C, and D shown in FIG. 15 is illustrated as an example and the relation of the number may be changed for the columnar spacers A, B, C, and D depending on the place as shown in the example of FIGS. 9A to 9C.

Further, in the plan view of the columnar spacer 210 in FIG. 15, while the boundary between the convex portion 211 and the concave portion 212 is identical with the extending direction of the data line 111 or the gate line 101, this embodiment is not restricted thereto but the boundary between the convex portion 211 and the concave portion 212 may be at a predetermined angle relative to the data line 111 or the gate line 101. It is important in four types of the columnar spacers 210 that the directions of the boundary lines between the convex portion 211 and the concave portion 212 are different by 90° from each other.

Fourth Embodiment

Figure 16:
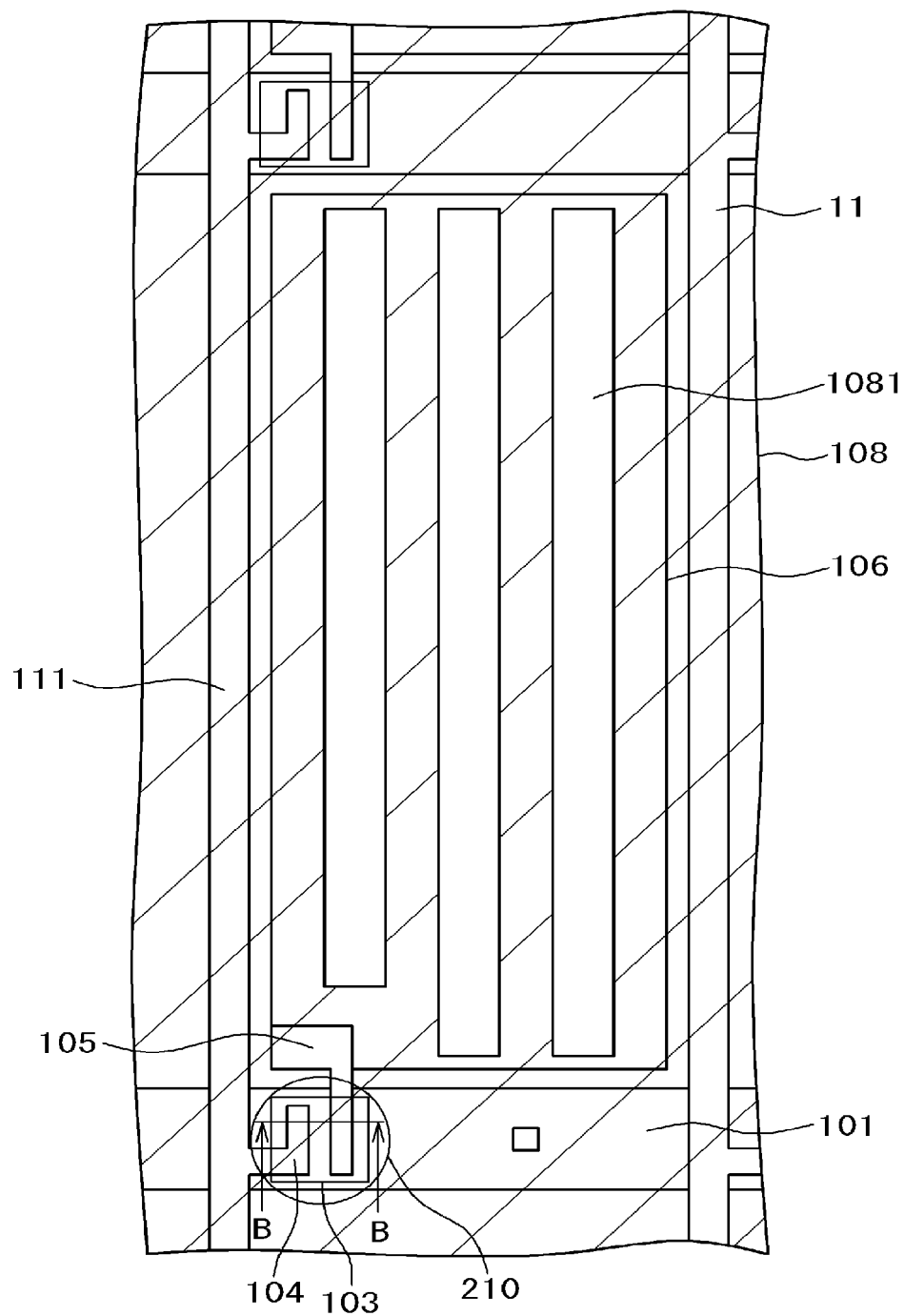
FIG. 16 is a plan view showing a fourth embodiment.
Figure 17:
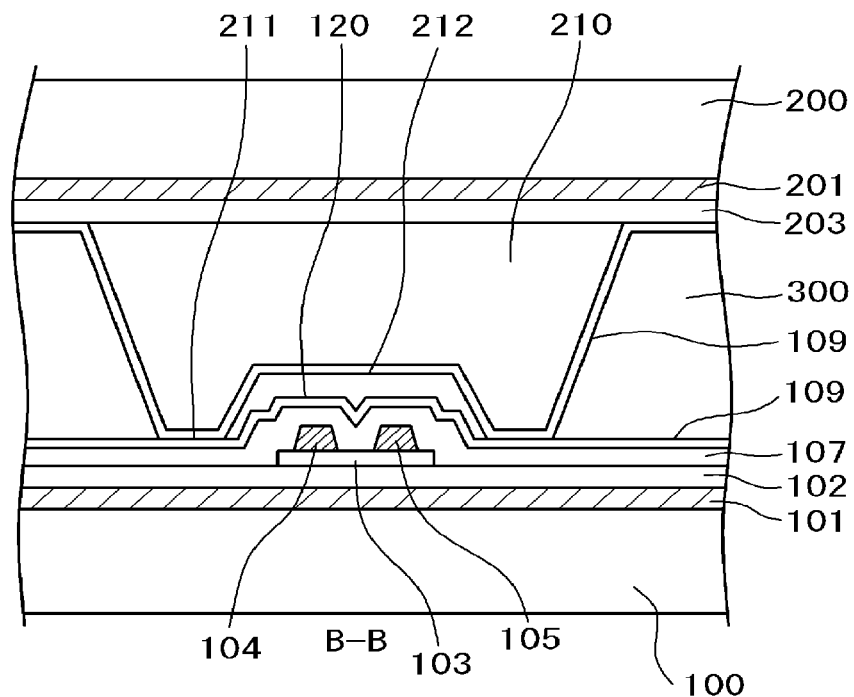
FIG. 17 is a cross sectional view of the fourth embodiment.
Figure 18:
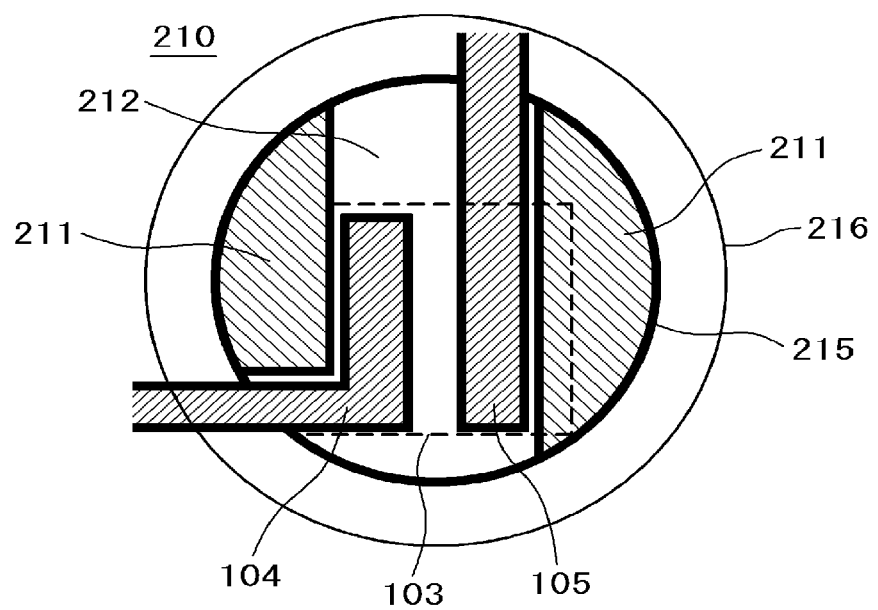
FIG. 18 is a detailed plan view of the fourth embodiment.

FIGS. 16 to 18 are views showing a fourth embodiment of the invention. In the first to third embodiments, the pedestal 120 is formed over the gate line 101. The pedestal 120 is formed by forming the pedestal base 130 below, for example, by using the semiconductor layer 103, the drain electrode layer 104, the pixel electrode layer 106, etc. In this embodiment, the drain electrode 104 and the source electrode 105 of the TFT are utilized as the pedestal base 130 without additionally forming the pedestal base 130.

FIG. 16 is a plan view of a pixel in this embodiment. In FIG. 16, a TFT is formed over a gate line 101 and a columnar spacer 210 is arranged to the portion of the TFT. Other configurations are identical with those explained in FIG. 1.

FIG. 17 is a cross sectional view along line B-B in FIG. 16. In FIG. 17, a gate line 101 is formed over a TFT substrate 100 and a gate insulating film 102 is formed over the gate line 101. A semiconductor layer 103 is formed over the gate insulating film 102, and a drain electrode 104 and a source electrode 105 are disposed over the semiconductor layer 103. The drain electrode 104 and the source electrode 105 also serve as a pedestal base 130. An inorganic film 107 is formed so as to cover the drain electrode 104 and the source electrode 105, and an alignment film 109 is formed thereover. The configuration on the side of the counter substrate 200 is identical as has been described with reference to FIG. 2.

A convex portion 211 and a concave portion 212 are formed at the top end of a columnar spacer 210 formed over an overcoat film 203 of a counter substrate 200. In FIG. 17, a convex portion 211 at the top end of the columnar spacer 210 is in contact with the TFT substrate 100. A concave portion 212 of the columnar spacer 210 is not in contact with a pedestal 120 formed on the TFT substrate 100. Then, when pressure is exerted on the counter substrate 200 of the liquid crystal display panel, the convex portion 211 at the top end of the columnar spacer 210 is compressed and the concave portion 212 of the columnar spacer 210 and the pedestal 120 are in contact with each other.

FIG. 18 is a plan view showing a relation between the drain electrode 104 and the source electrode 105 used as the pedestal base 130, and the convex portion 211 and the concave portion 212 of the columnar spacer 210. In FIG. 18, the drain electrode 104 and the source electrode 105 formed over the semiconductor layer 103 are arranged corresponding to the concave portion 212 of the columnar spacer 210. The drain electrode 104 and the source electrode 105 are constrained by the convex portion 211 formed at the top end of the columnar spacer 210. As a result, positional displacement between the TFT substrate 100 and the counter substrate 200 in the liquid crystal display panel can be prevented.

In FIG. 18, since the concave portion 212 at the top end of the columnar spacer 210 is opened at the ends, the liquid material of the alignment film does not accumulate in the concave portion. Accordingly, since the alignment film 109 is not formed thick in the concave portion, occurrence of bright spots caused by scraping of the alignment film can be suppressed. As described above, this embodiment has an advantage that the same configuration as in the existent embodiment can be used on the side of the TFT substrate 100 and, accordingly, can be formed by using the same mask as in the existent embodiment.

In the configuration of FIG. 17, the top end of the pedestal 120 formed by the drain electrode 104 and the source electrode 105 are not in contact with the concave portion 212 of the columnar spacer 210 in a usual state. Alternatively, by decreasing the height of the convex portion 211 of the columnar spacer 210, it may be configured such that the pedestal 120 and the concave portion 212 of the columnar spacer 210 are always in contact with each other, and the convex portion 211 of the columnar spacer 210 and the TFT substrate 100 are in contact with each other when a pressure is exerted on the counter substrate 200 in the same manner as shown in FIG. 2.

Fifth Embodiment

Figure 19A:
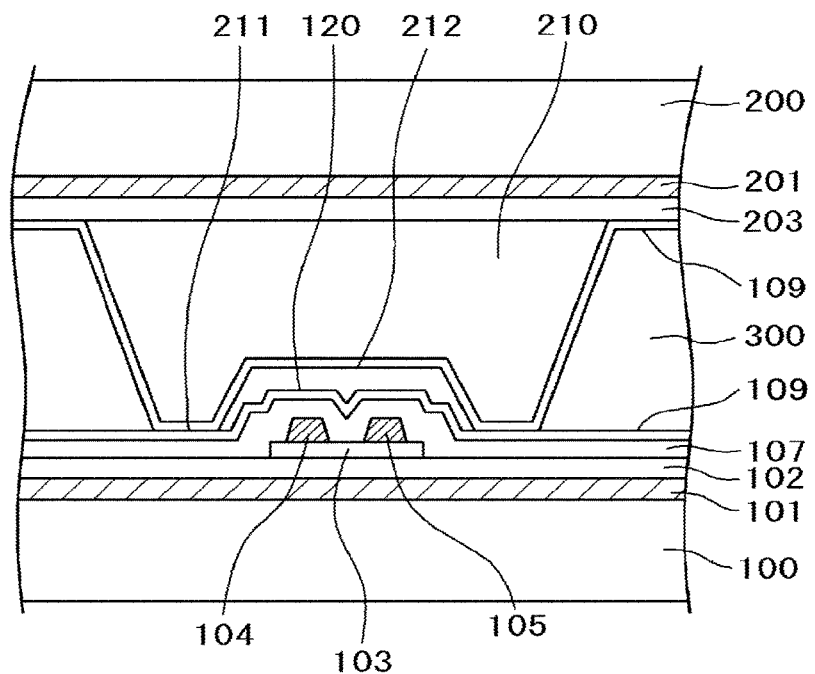
FIGS. 19A and 19B show a cross sectional view of a fifth embodiment.
Figure 19B:
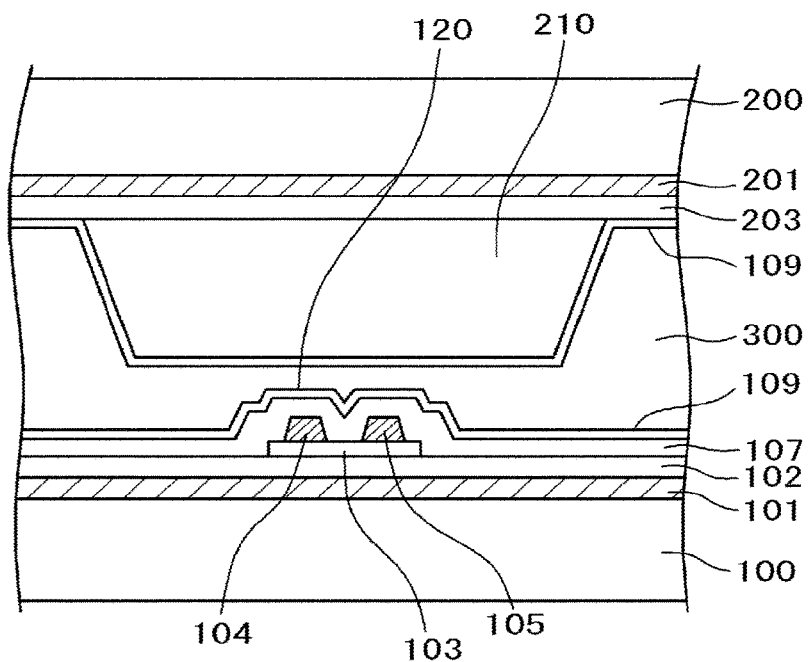

FIGS. 19A and 19B are cross sectional views showing a fifth embodiment of the invention. FIG. 19A is identical with FIG. 17. In FIG. 19B, a convex portion 211 is not formed on a columnar spacer 210. In FIG. 19B, the columnar spacer 210 is not in contact with a pedestal 120 formed by a drain electrode 104 and a source electrode 105 in a usual state of a columnar spacer 210, that is, in a state where pressure is not exerted on a counter substrate 200.

Particularly, in this embodiment, when a pressure is exerted on the counter substrate 200 of the liquid crystal display panel, the stress is dispersed by the combined use of the columnar spacers 210 in FIG. 19A and in FIG. 19B, and the time to recovery the initial state is shortened upon pressure is removed. That is, when the pressure is exerted on the counter substrate 200 of the liquid crystal display panel, the columnar spacer 210 shown in FIG. 19B is at first in contact with the pedestal 120 and, when the pressure is further exerted, the concave portion 212 of the columnar spacer 210 shown in FIG. 19A is in contact with the pedestal 120. Depending on the gap between the columnar spacer 210 and the pedestal 120, the order of contact between the spacer and the pedestal may be reversed.

Sixth Embodiment

In the invention, it is essential to form the convex portion 211 and the concave portion 212 at the top end of the columnar spacer 210. Accordingly, the diameter of the columnar spacer 210 of the invention tends to be increased. The pedestal 120 and the columnar spacer 210 are often formed at the portion corresponding to the gate line 101. Although the gate line 101 is formed at a large width, when the diameter is larger as in the columnar spacer 210 of the invention, the columnar spacer may sometimes protrude out of the gate line 101.

Figure 20:
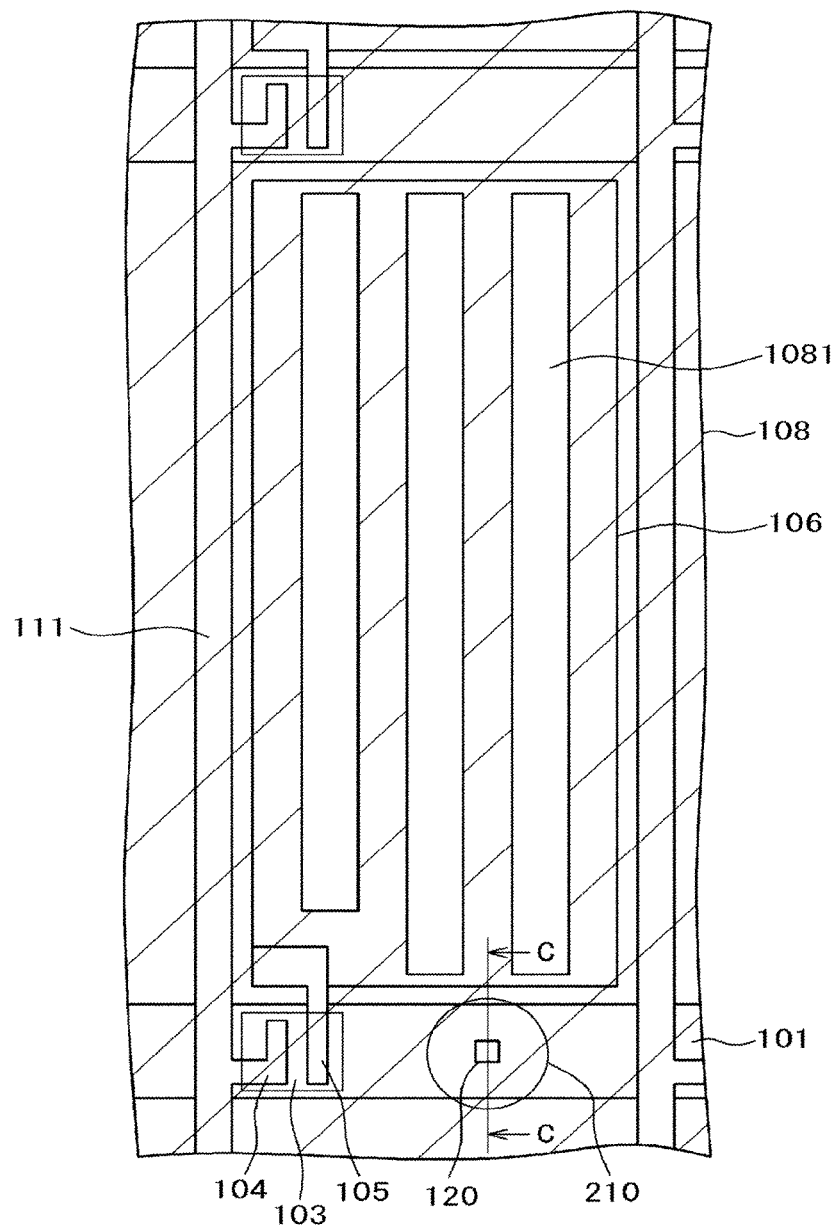
FIG. 20 is a plan view of a sixth embodiment.

In FIG. 20, a columnar spacer 210 is disposed over a gate line 101 and, since the diameter of the columnar spacer 210 is large, the formed columnar spacer 210 is formed in a state of protruding from the gate line 101. Other configurations of FIG. 20 are identical with those of FIG. 1. In a portion where the columnar spacer 210 is formed, alignment of liquid crystals becomes abnormal to generate domains when rubbing alignment is adopted.

Figure 22:
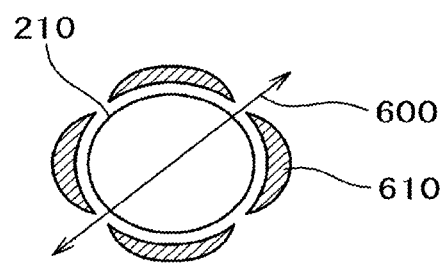
FIG. 22 is a plan view showing a problem when rubbing alignment is adopted.

FIG. 22 is a plan view showing a state in which a not rubbed portion is left at the periphery of a columnar spacer 210 when initial alignment is applied to the counter substrate 200 by a rubbing treatment, and light leakage 610 is caused at that portion. In FIG. 22, an arrow shows the rubbing direction 600. In FIG. 22, since the columnar spacer 210 has a height, not rubbed portions are formed at the periphery of the columnar spacer 210 as shown by hatched lines in FIG. 22. The portions cause light leakage 610 to deteriorate the contrast. Accordingly, the portions have to be shielded against light, for example, by a black matrix 201 or the like formed on the counter substrate 200. However, transmittance of the liquid crystal display panel is deteriorated.

This embodiment intends not to deteriorate the transmittance even when the diameter of the columnar spacer 210 is large, by utilizing also the lateral side of the columnar spacer 210 as the display region by adopting the optical alignment together in the invention. In the optical alignment, a polarized UV light is applied to the alignment film 109 thereby causing monoaxial anisotropy and conducting initial alignment of liquid crystals. Accordingly, since alignment ability can be obtained in the optical alignment by polarized UV light irradiation, the rubbing shadow 610 which is generated in the rubbing alignment is not caused.

Figure 21:
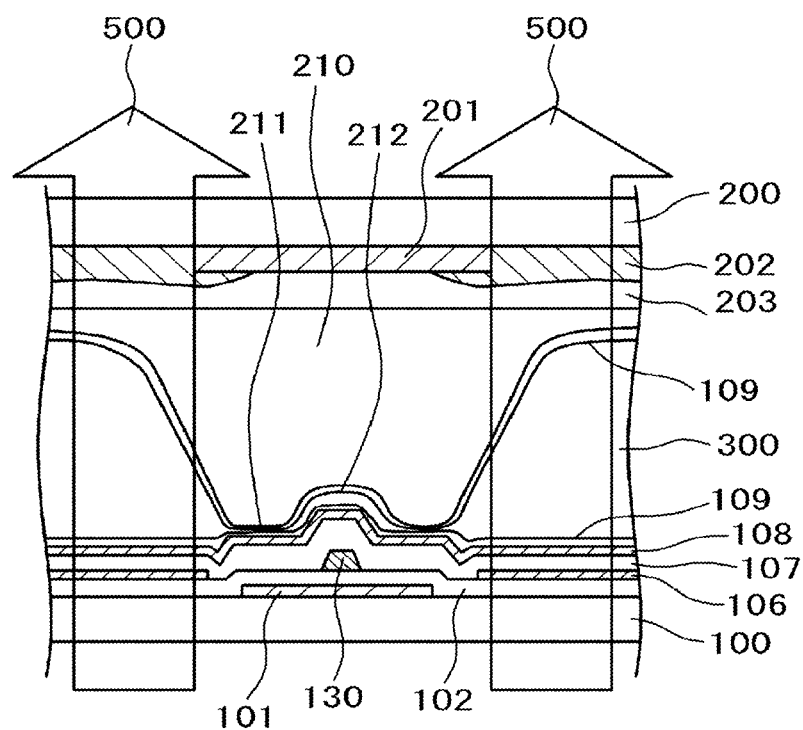
FIG. 21 is a cross sectional view of the sixth embodiment.

FIG. 21 is a cross sectional view along line C-C in FIG. 20. In FIG. 21, the configuration on the side of a TFT substrate 100 is identical with that of FIG. 2 or FIG. 4. A black matrix 201 and a color filter 202 are formed on a counter substrate 200 and an overcoat film 203 is formed so as to cover them. A columnar spacer 210 is formed over the overcoat film 203. The diameter of the columnar spacer 210 is larger than the width of the gate line 101.

In the rubbing alignment, since the rubbing shadow is generated, the width of the black matrix 201 is formed larger than the diameter of the columnar spacer 210 to prevent deterioration of the contrast. However, in the invention, the width of the black matrix 201 is smaller than the diameter of the columnar spacer 210 as shown in FIG. 21. The diameter means herein the diameter of the columnar spacer 210 in a trapezoidal cross section for a portion having a larger width, that is, the diameter of a lower bottom 216. Specifically, also the lateral side of the columnar spacer 210 is used as the display region 400 as shown by arrows 500 that show a transmission light in FIG. 21.

The alignment film 109 is formed also on the lateral side of the columnar spacer 210 and by a polarized UV light irradiation to the alignment film 109, alignment ability is provided to liquid crystal molecules. Since the columnar spacer 210 has a predetermined height, the thickness of the alignment film 109 tends to be decreased on the lateral side of the columnar spacer 210. Also in such a case, the alignment film 109 can be formed at such a thickness that can provide optical alignment up to about ⅔ the height of the columnar spacer 210.

As described above according to this embodiment, since it is not necessary to enlarge the light shielding region by the black matrix 201 also in the configuration where the convex portion 211 and the concave portion 212 are formed at the top end of the columnar spacer 210 and the diameter of the columnar spacer 210 is increased, degradation of the transmittance of the liquid crystal display panel can be suppressed.

What is claimed is:

1. A display device comprising:
   a transistor substrate including a plurality of transistors, a second protrusion, and a fourth protrusion; and
   a counter substrate facing the transistor substrate and including a first protrusion and a third protrusion, wherein
   in a plan view, the first protrusion is located adjacent to the second protrusion in a first direction, a side surface of the first protrusion faces a side surface of the second protrusion, in a plan view, the third protrusion is located adjacent to the fourth protrusion in a second direction that intersects the first direction, a side surface of the third protrusion faces a side surface of the fourth protrusion, a first set of protrusions includes the first protrusion and the second protrusion and one of the first protrusion and the second protrusion is respectively in contact with the transistor substrate and the counter substrate, a second set of protrusions includes the third protrusion and the fourth protrusion and one of the third protrusion and the fourth protrusion is respectively in contact with the transistor substrate and the counter substrate, and the first set of protrusions is separately and alternatively arranged from the second set of protrusions by a different gate line or data line.

2. The display device according to claim 1, wherein the transistor substrate further includes a first pixel electrode and a second pixel electrode, in a plan view, the first set of protrusions corresponds to the first pixel electrode, and in a plan view, the second set of protrusions corresponds to the second pixel electrode.

3. The display device according to claim 1, wherein the second protrusion overlaps with a semiconductor layer, in a plan view.

4. The display device according to claim 1, wherein a gap extends between the first protrusion and the transistor substrate.

5. The display device according to claim 1, wherein a gap extends between the second protrusion and the counter substrate.

6. The display device according to claim 1, wherein the first protrusion includes a first area that overlaps the second protrusion and a second area that does not overlap the second protrusion, in a plan view.

7. The display device according to claim 1, wherein a height of the first protrusion is greater than a height of the second protrusion.

8. The display device according to claim 1, wherein the first direction is substantially orthogonal to the second direction.

9. The display device according to claim 1, wherein the transistor substrate further includes a sixth protrusion, the counter substrate further includes a fifth protrusion, in a plan view, the sixth protrusion is located adjacent to the fifth protrusion in the first direction in this order, a side surface of the fifth protrusion faces a side surface of the sixth protrusion, and a third set of protrusions includes the fifth protrusion and the sixth protrusion and one of the fifth protrusion and the sixth protrusion is in contact with an opposing substrate.

10. The display device according to claim 9, wherein the transistor substrate further includes an eighth protrusion, the counter substrate further includes a seventh protrusion, in a plan view, the eighth protrusion is located adjacent to the seventh protrusion in the second direction in this order, a side surface of the seventh protrusion faces a side surface of the eighth protrusion, and a fourth set of protrusions includes the seventh protrusion and the eighth protrusion and one of the seventh protrusion and the eighth protrusion is in contact with an opposing substrate.

11. The display device according to claim 9, wherein the first set of protrusions and the third set of protrusions are arranged substantially parallel to each other, in a plan view.

12. The display device according to claim 10, wherein the third set of protrusions and the fourth set of protrusions are arranged substantially parallel to each other, in a plan view.

13. A display device comprising:
a transistor substrate including a plurality of transistors, a second protrusion, and a sixth protrusion; and
a counter substrate facing the transistor substrate and including a first protrusion and a fifth protrusion, wherein in a plan view, the first protrusion is located adjacent to the second protrusion in a first direction in this order, a side surface of the first protrusion faces a side surface of the second protrusion, in a plan view, the sixth protrusion is located adjacent to the fifth protrusion in the first direction in this order, a side surface of the fifth protrusion faces a side surface of the sixth protrusion, a first set of protrusions includes the first protrusion and the second protrusion and one of the first protrusion and the second protrusion is respectively in contact with the transistor substrate and the counter substrate, a third set of protrusions includes the fifth protrusion and the sixth protrusion and one of the fifth protrusion and the sixth protrusion is respectively in contact with the transistor substrate and the counter substrate, and the first set of protrusions is separately and alternatively arranged from the third set of protrusions by a different gate line or a data line.

14. The display device according to claim 13, wherein the transistor substrate further includes a first pixel electrode and a third pixel electrode, in a plan view, the first set of protrusions corresponds to the first pixel electrode, and in a plan view, the third set of protrusions corresponds to the third pixel electrode.

15. The display device according to claim 13, wherein the second protrusion overlaps with a semiconductor layer, in a plan view.

16. The display device according to claim 13, wherein a gap extends between the first protrusion and the transistor substrate.

17. The display device according to claim 13, wherein a gap extends between the second protrusion and the counter substrate.

18. The display device according to claim 13, wherein the first protrusion includes a first area that overlaps the second protrusion and a second area that does not overlap the second protrusion, in a plan view.

19. The display device according to claim 13, wherein a height of the first protrusion is greater than a height of the second protrusion.

20. The display device according to claim 13, wherein the first set of protrusions and the third set of protrusions are arranged substantially parallel to each other, in a plan view.

* * * * *